F. HENNEBÖHLE.
BACK PRESSURE AND RELIEF VALVE.
APPLICATION FILED OCT. 6, 1919.
1,344,300.
Patented June 22, 1920.
2 SHEETS—SHEET 1.
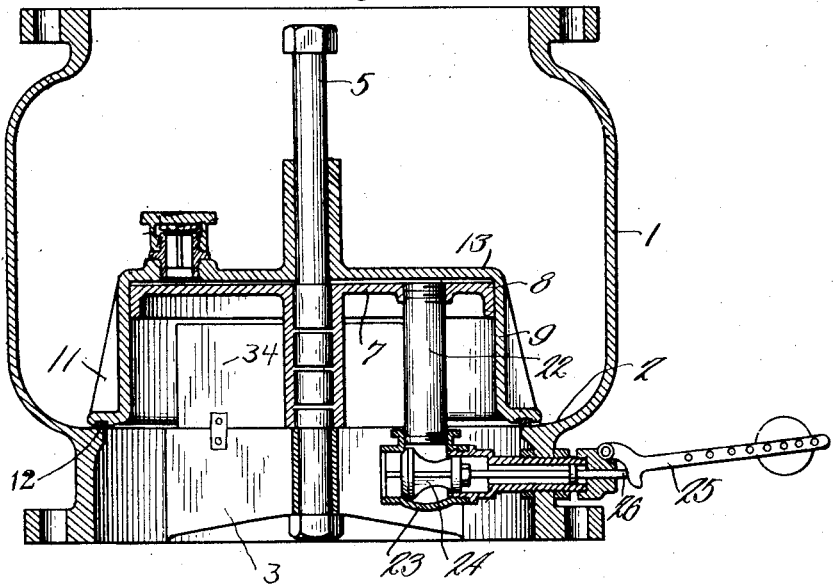
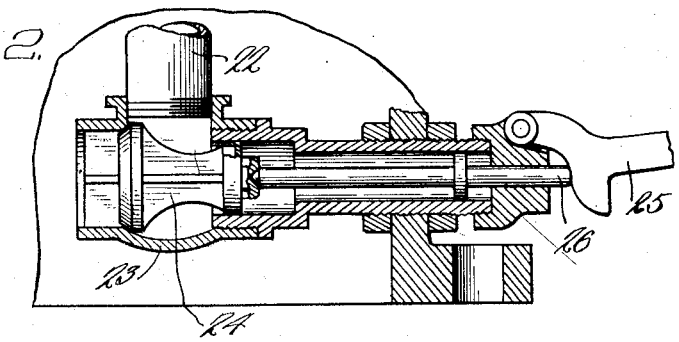
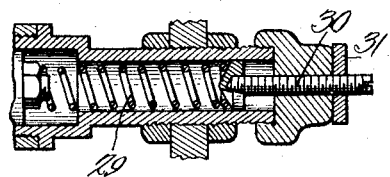
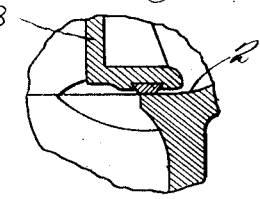
Inventor:
Frank Henneböhle
by Albert Scheibl
Attorney
Witness:

F. HENNEBÖHLE.
BACK PRESSURE AND RELIEF VALVE.
APPLICATION FILED OCT. 6, 1919.
1,344,300.
Patented June 22, 1920.
2 SHEETS—SHEET 2.
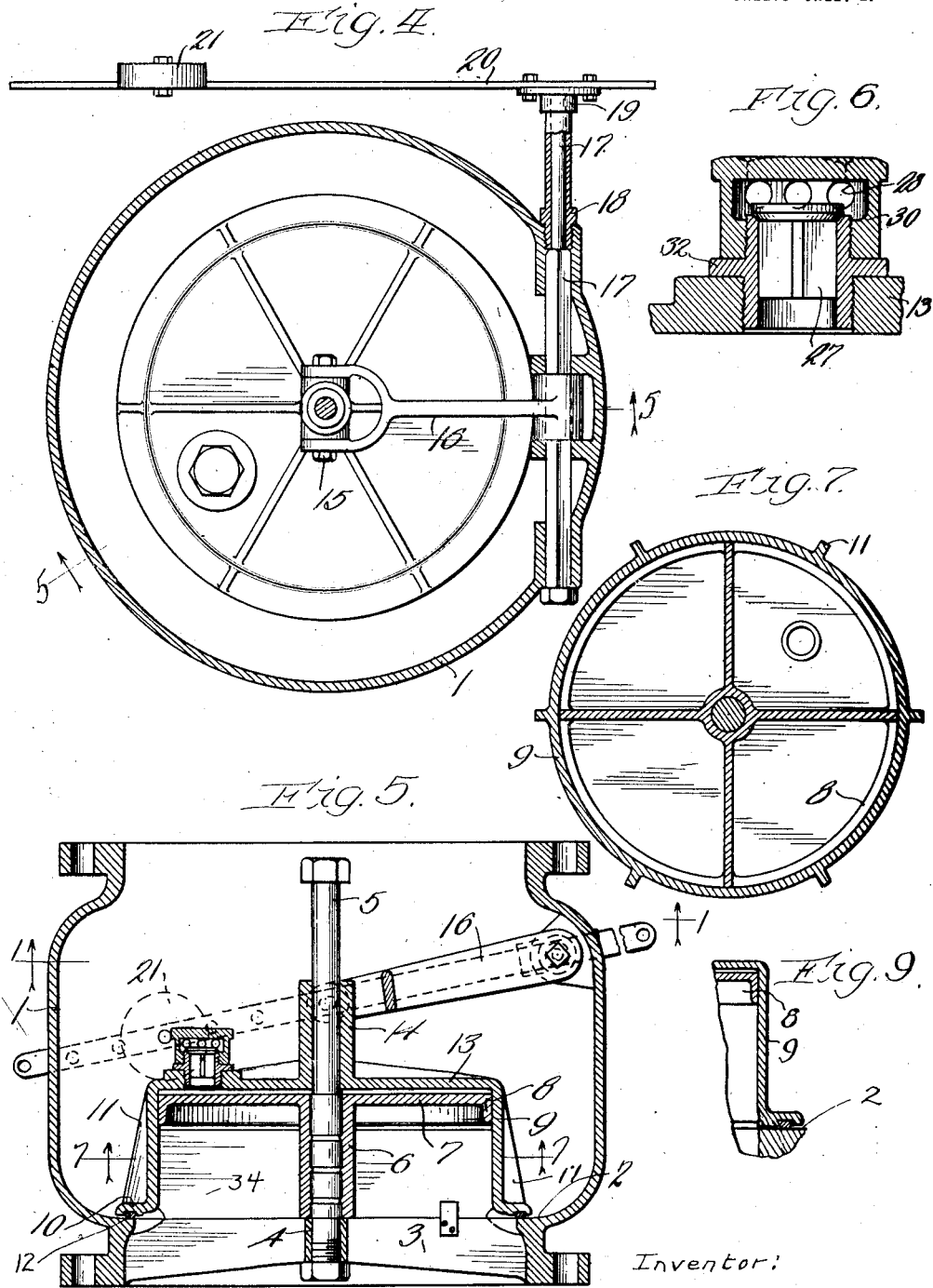
Inventor:
Frank Henneböhle
by Albert Scheible Attorney
Witness:

UNITED STATES PATENT OFFICE.

FRANK HENNEBÖHLE, OF CHICAGO, ILLINOIS.

BACK-PRESSURE AND RELIEF VALVE.

1,344,300.   Specification of Letters Patent.   Patented June 22, 1920.

Application filed October 6, 1919. Serial No. 328,759.

*To all whom it may concern:*

Be it known that I, FRANK HENNEBÖHLE, citizen of the United States, residing at Chicago, Illinois, have invented certain new and useful Improvements in Back-Pressure and Relief Valves; and I do hereby declare the following to be a full, clear, and exact description of the invention, such as will enable others skilled in the art to which it appertains to make and use the same.

My invention relates to valves of the general class used for affording an atmospheric exhaust relief in connection with condensing engines, and used as back pressure valves with non-condensing engines. Heretofore, valves of this general class have commonly been constructed for accurately adjusted operation in the form of balanced or semi-balanced valves in which the operating pressure is applied differentially to the opposite faces of the movable valve member. While this construction is quite feasible for small sizes of valves, it is not so desirable for large valves, owing to the high costs involved and the difficulty of adjusting such valves for operating at different relief pressures.

To overcome these and other objections, my invention aims to provide a valve of the class described which will employ only a relatively small part of the normal operative face of the movable valve member and which will effect this subtraction without involving the size, weight and complications of a semi-balanced valve construction. In one aspect, my invention aims to provide a valve in which the movable member has a desired proportion of its active face screened from the operative pressure; to provide simple means for effecting such a screening, and desirably to use the screen itself as part of the mounting for the movable valve member; to prevent the accumulating of vapor or gas under pressure between this screen and part of the movable valve member screened by the same; to provide simple means for maintaining the movable valve member and its support in alinement at all times; and to provide simple means for adjusting the pressure at which the valve is to be operated.

In another aspect, my invention aims to provide a valve having any desired proportion of its face normally screened from the operative pressure, to provide means actuated by an excess of pressure for admitting the actuating pressure between the screen and the part of the valve screened by the same, so as to apply pressure for opening the valve; to provide simple and automatic means for venting the space between the screen and the valve, and to provide simple means for adjusting the excess of pressure at which the valve is operated. Still further objects will appear from the following specification and from the accompanying drawings, which show my invention as embodied in a valve suitable for use in connection with vertical pipes. In the drawings—

Figure 1 is a central and vertical section through a valve of the class described, showing an embodiment in which the major portion of the active face of the valve is normally screened from the pressure, and showing automatic means for admitting pressure under the screen to open the valve.

Fig. 2 is an enlarged central and longitudinal section through the semi-balanced valve which automatically admits the operative pressure under the screen in the embodiment of Fig. 1.

Fig. 3 is a fragmentary section showing a portion of Fig. 2 modified to operate with an adjustable spring instead of a weighted lever.

Fig. 4 shows a horizontal cross-section through the valve taken along the axis of the rocking lever which supports the adjustable weight.

Fig. 5 is a vertical section through the same valve taken along the angular line 5—5 of Fig. 4.

Fig. 6 is an enlarged and central vertical section through the check valve or vent on the movable valve member.

Fig. 7 is a horizontal section taken along the correspondingly numbered line in Fig. 5 and looking upward.

Fig. 8 is an enlarged fragmentary section of the lower edge portion of the movable valve member, showing the mounting of the cushioning ring which makes the valve practically noiseless.

Fig. 9 is a fragmentary section showing an edge portion of the movable valve member and a support normally screening the entire operative face of the valve member.

Referring first to Figs. 1 and 2, these show an embodiment of my invention having a casing 1 equipped with upper and lower flanges for affording the usual pipe connections and having near its lower end an upwardly directed seat 2. Spanning the lower mouth of the casing is a spider having arms 3 supporting a central and vertically bored hub 4. Bolted through this hub and extending upwardly is a shaft 5 which has cast upon it a sleeve 6 carrying an outwardly directed flat flange 7, which flange terminates in a cylindrical rim 8. This cylindrical rim 8 serves as the slidable mounting for the movable valve member of my appliance, which member is here shown in the form of a downwardly open cup having a cylindrical casing 9 slidably fitting the exterior of the rim 8. At its lower end, the casing 9 carries an outwardly directed flange 10 which is stiffened by ribs 11 and which carries a bearing ring 12 of a suitable seating material such as white metal.

The top 13 of the movable valve member desirably has its interior flat so that the same may extend rather close to the top of the flange 7 when the valve is closed, and this top carries a sleeve 14 adapted to slide freely on the bolt 5 and connected by a pivot bolt 15 with a lever 16 which is fast upon a rock shaft 17. The shaft 17 is suitably pivoted in the casing 1 and has an extension projecting through a bushing 18 outside of the valve casing. This extension portion of the shaft carries a flange 19 adapted to be bolted in various positions to an arm 20 carrying a weight 21.

With the parts thus arranged, it will be obvious from Fig. 2 of the drawings that the pressure of steam, gas or the like entering the lower end of the valve casing will be screened from the top 13 of the movable valve member by the flange or screen 7 so that this pressure will only be operatively effective on the relatively narrow portion of the rim 10 which is smaller in diameter than the bore of the seat 2. Consequently, I obtain a decided subtractive effect without employing a regular semi-balanced valve construction. By varying the relative diameters of the bore of the seat and of the casing 9 of the cup, I can readily vary the proportional amount of the screening, so as to leave the effective area only one-eighth, one-fourth or any other desired portion of the valve opening. Consequently, by varying the diameter of the flange 7 and correspondingly varying the diameter of the casing 9, I can employ the same valve casing for valves designed to be operative at widely differing back pressures. That is to say, the flange 7 which coöperates with the bolt 5 in guiding the movable valve member acts as an area-diminishing piston, and as this piston is increased in diameter in proportion to the seat opening, the amount of back pressure required to operate the valve is correspondingly increased. Then I can obtain still further adjustments both by moving the lever 20 lengthwise more or less across the axis of the rock shaft 17 and by shifting the position of the weight 21 on this lever, for both of which purposes I desirably equip the lever 20 with a plurality of interchangeably employed apertures as shown in the drawings.

In practice, I merely machine the rim 8 and the bore of the casing 9 to an approximate sliding fit, so as to allow for differences of expansion and contraction. Consequently, some of the steam or other fluid for which the valve is used may pass between these parts into the space between the flange 7 and the closed end 13 of the movable valve member, and this fluid might then resist the returning of the cup to its seating position. To avoid this without affording opportunity for a continuous leakage, I desirably provide a vent or check valve in the top 13. This is shown in Fig. 6 in the form of a bushing 32 carrying a laterally perforated casing 30 and having a gravity-return check valve member 27 slidably mounted in the bore of the bushing. To ease the slidable movement of the valve member, I desirably guide its bore not only by the rim 8 of the screen but also by wings 34 cast on the sleeve 6, which wings may be fastened to the spider arms 3 as shown in the drawings.

It will be obvious from the above that I can readily reduce the effective area of the movable valve member to a relatively small portion of the bore of the valve, while still permitting the movable valve member to lift for such a distance as to provide an opening equal to this total area. For example, in Fig. 2, the head of the bolt 5 may act as a stop for limiting the upward lift of the movable valve member. In doing so, my construction obviates the necessity for providing access for the pressure to oppositely directed heads as is also necessary in semi-balanced valve construction, and I am therefore able to effect a decided reduction in the size and weight of the valve as a whole and in the cost of the same.

However, I do not need to depend on the differences in diameter between the rim 8 and the mouth of the seat 2 for actuating the valve, but desirably provide a more speedy action of the valve by admitting fluid under pressure into the space between the screen 7 and the closed end 13 of the cup or cylinder which forms the movable valve. For this purpose, I may provide the screen 7 with an aperture connected by a pipe 22 with a casing 23 containing a semi-balanced control valve 24 which is normally kept closed by the pressure of a weighted lever 25 on the stem of the valve. By adjusting the position of the weight on the lever 25 I can vary the pressure at which the valve member 24 is moved toward the right in Fig. 1 to permit fluid to pass through the pipe 22 into the space between the screen 7 and the head 13 of the movable valve member. When the fluid under pressure is admitted to this spacing, the resulting pressure will raise the check valve 27 and thereby permit some of the fluid to escape through the openings 28 as shown in Fig. 6. However, the total area of these openings 28 is made considerably smaller than the bore of the pipe 22, thereby maintaining a sufficient pressure above the screen 7 to raise the movable valve member. As soon as this raising has allowed a sufficient amount of fluid to escape above the seat 2 and into the main portion of the casing 1 to reduce the pressure to the desired extent, the weighted lever 25 will return the control valve 24 to its normal position and the cup-shaped valve member will then drop back upon its seat.

Moreover, while I have illustrated and described a desirable embodiment of my invention, I do not wish to be limited to the details of the construction and arrangement here disclosed, it being obvious that the same might be modified in many ways without departing from the spirit of my invention as recited in the appended claims.

For example, instead of controlling the valve 24 by a weighted lever, I may resist the movement of this valve by a spring 29 adjusted as to its compression by a screw 30 which is normally locked into position by means of a lock nut 31. Likewise, with the embodiment of Fig. 1, I may if desired make the bore of the cup or cylinder casing 9 equal in diameter to the bore of the seat, as shown in Fig. 9, thereby depending entirely on the admission of fluid between the screen and the closed end of the cup, and not in part on the differential action afforded by screening only a part of the operative face of the movable valve member.

I claim as my invention:

1. In a back-pressure or relief valve, a valve casing, a valve member movable within the casing and continuously subject to the operative pressure and means secured to the casing for guiding the movable valve member and for normally screening only a part of the latter from the operative pressure, and a check valve arranged for retarding the escape of fluid from the space between the screened part of the said valve member and the means which normally screen it.

2. In a back-pressure or relief valve, a valve casing, a valve member movable within the casing, means secured to the casing for guiding the movable valve member, a screen carried by the guide means and normally screening the major portion of the said valve member from the operative pressure, and means actuated by an excess of the operative pressure for annulling the screening effect of the screen.

3. In a back-pressure or relief valve, a valve casing, a valve member movable within the casing, guides fast within the casing for guiding the movable valve member and a screen fast upon the guides and normally screening at least the major portion of the said valve member from the operative pressure, means actuated by an excess of the operative pressure for admitting fluid under operative pressure into the space between the screen and the valve part normally screened thereby, and a check valve arranged for more slowly permitting the escape of fluid from the said space.

4. In a valve of the class described, a casing, a cup-shaped valve member movable within the casing and normally having its rim engaging the seat on the casing, guides fast on the casing and engaging the bore of the cup-shaped member to guide the latter, and a screen fast on the guides and screening the closed end of the cup from the operative pressure.

5. A valve as per claim 4, in combination with a vent for fluid entrapped between the closed end of the cup and the screen.

6. A valve as per claim 4, in combination with means actuated by an excess of the operative pressure for admitting operative pressure to the space between the closed end of the cup and the screen.

7. A valve as per claim 4, in combination with means actuated by an excess of the operative pressure for annulling the screening effect of the screen.

8. A valve as per claim 4, in which the screen has an aperture, in combination with a valve actuated by an excess of the operative pressure and controlling the passage of fluid through the aperture.

9. A valve as per claim 4 in which the screen has an aperture, in combination with a valve actuated by an excess of the operative pressure and controlling the passage of fluid through the aperture, and means for adjusting the excess of pressure at which the last named valve operates.

10. A valve body, a substantially cup-shaped member slidably mounted within the valve body and normally closing its inlet, and means supported by the valve body within the slidable member for restricting the operative pressure on the said member to the outer portion of the latter.

11. A valve body having an inwardly directed seat surrounding its inlet, a disk rigidly mounted within the body parallel to the said seat, and a cup-shaped valve slidable upon the disk and having its mouth normally engaging the seat.

12. A valve as per claim 11, in combination with a check-valve arranged for permitting the escape of gas or vapor entrapped between the disk and the closed end of the cup-shaped valve.

13. A valve as per claim 11, in combination with means for pressing the valve against the seat.

14. A valve body having an inwardly directed seat, a cup-shaped valve member having its mouth normally engaging the seat, a spider fast on the body and extending into said valve member, and a disk carried by the spider and slidably fitting the said valve member.

15. A valve body having an inwardly directed seat, a cup-shaped valve member having its mouth normally engaging the seat, a spider fast on the body and extending into said valve member, and a disk carried by the spider and slidably fitting the said valve member, and a check-valve mounted in the closed end of the said valve member and arranged for permitting the escape of gas or vapor entrapped between the said closed end and the disk.

Signed at Chicago, October 4th, 1919.

FRANK HENNEBÖHLE.